United States Patent
Jang et al.

(10) Patent No.: US 8,838,537 B2
(45) Date of Patent: Sep. 16, 2014

(54) SYSTEM AND DEVICE FOR DATA MANAGEMENT, AND METHOD THEREOF

(75) Inventors: Yun Seok Jang, Seoul (KR); Jae Hyun Park, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 231 days.

(21) Appl. No.: 12/872,588

(22) Filed: Aug. 31, 2010

(65) Prior Publication Data

US 2011/0055152 A1    Mar. 3, 2011

(30) Foreign Application Priority Data

Aug. 31, 2009   (KR) .................. 10-2009-0081395

(51) Int. Cl.
*G06Q 10/10* (2012.01)
*H04L 29/08* (2006.01)

(52) U.S. Cl.
CPC ............ *G06Q 10/10* (2013.01); *H04L 67/1095* (2013.01); *H04L 67/04* (2013.01); *H04L 67/34* (2013.01)
USPC ........................................................ 707/621

(58) Field of Classification Search
CPC .................... G06F 17/30575; G06F 17/30174; G06F 17/30581
USPC .................. 707/610, 617, 620, 621, 365
See application file for complete search history.

(56) References Cited

U.S. PATENT DOCUMENTS

| | | | |
|---|---|---|---|
| 7,523,191 B1 | 4/2009 | Thomas et al. | |
| 7,865,539 B2 * | 1/2011 | Talanis et al. ................ | 707/829 |
| 2003/0084361 A1 * | 5/2003 | Lawrence et al. ............ | 713/400 |
| 2003/0105782 A1 | 6/2003 | Brodersen et al. | |
| 2003/0220966 A1 * | 11/2003 | Hepper et al. ................ | 709/203 |
| 2006/0031264 A1 | 2/2006 | Bosworth et al. | |
| 2007/0088764 A1 | 4/2007 | Yoon et al. | |
| 2009/0271447 A1 * | 10/2009 | Shin et al. .................... | 707/201 |
| 2010/0198886 A1 * | 8/2010 | Ferrazzini et al. ........... | 707/822 |

FOREIGN PATENT DOCUMENTS

KR   100678921   1/2007

* cited by examiner

*Primary Examiner* — Thu-Nguyet Le
(74) *Attorney, Agent, or Firm* — The Farrell Law Firm, P.C.

(57) ABSTRACT

Provided are a data management method, device and system for synchronizing data without prior knowledge of the data's structure. When any application is activated, application data is created and also an application data change log is created to indicate a change in the application data. In addition, a schema table defining a data structure for storing the application data is created and also a schema table change log indicating a change in the schema table is created. Based on such data and logs, a client and a server can share data without a prior agreement in data schema.

20 Claims, 5 Drawing Sheets

SYSTEM AND DEVICE FOR DATA MANAGEMENT, AND METHOD THEREOF

PRIORITY

This application claims priority under 35 U.S.C. §119(a) to an application filed in the Korean Intellectual Property Office on Aug. 31, 2009, and assigned Serial No. 10-2009-0081395, the contents of which are incorporated herein by reference.

BACKGROUND OF THE INVENTION

1. Field of the Invention

The present invention relates generally to data management and more particularly to a data management method, device and system for allowing data, created by an application activated in a client or server, to be stored, transmitted and synchronized without a particular agreement in data schema.

2. Description of the Related Art

With the advent of new techniques and functions arousing customers' interest, the market of mobile devices is experiencing rapid and strong growth. Moreover, dramatic advances in mobile communication technology are allowing traditional mobile devices to have a variety of applications that meet customers' demands. Therefore, users of mobile devices today come to use information in various forms of voice, text, graphics, etc. and to enjoy music, broadcast television, games, etc.

The use of various functions in a mobile device produces a large amount of data. For example, in the case of a phonebook function, a mobile device often extends a data structure in order to record additional data entered by a user. Also, a mobile device stores and manages various image data, depending on the data structure supported by a camera application.

Meanwhile, a user of a mobile device may often desire to transfer data stored in a mobile device to other media. For example, due to a limited memory capacity of a mobile device, or for the purpose of data backup, a user may want to transmit or copy data in the memory of a mobile device to a server or a personal computer. For such transmission and storage of data, a device and a server should reach in advance a particular agreement in data schema.

Traditionally, standards organizations such as the W3C (World Wide Web Consortium), IETF (Internet Engineering Task Force) and others have created standards for data exchange between devices. Based upon such a standard, the devices may perform a synchronization process for data transmission. However, since such a standard is generally not automatically applied to new applications, it is normally required to perform an additional process to match data created by any application with a traditional standard in order to allow data transmission between a device and a server. Additionally, a device and a server should involve a parser and a builder in order to share data created by any application. Unfortunately, this may cause a burden of constructing a parser and a builder for each application and of distributing them to a device and a server.

BRIEF SUMMARY OF THE INVENTION

Accordingly, the present invention addresses the above-mentioned problems and/or disadvantages and offers least the advantages described below.

Aspects of the present invention provide a data management method, device and system for allowing a client and server to share data, created by an application, without being restricted by a particular data schema.

According to one aspect of the present invention, a data management system is provided, which includes a client device configured to store an application data change log and a schema table wherein the application data change log indicates at least one of creation, modification and deletion of application data created by activation of an application and wherein the schema table defines a data structure for storing the application data; and a server device configured to receive at least one of the schema table and the application data from the client device through a communication channel with the client device, to apply the creation, modification and deletion to the application data, based on the schema table, and to store the application data.

According to another aspect of the present invention, a data management device is provided which includes a memory unit configured to store at least one application and at least one data item among application data created by activation of the application, an application data change log indicating a change in the application data, a schema table defining a data structure for storing the application data, and a schema table change log indicating a change in the schema table; at least one of a radio frequency unit and a connection interface configured to establish a communication channel for transmitting the at least one data item; and a control unit configured to control transmission of the at least one data item through the communication channel in response to an input signal.

According to still another aspect of the present invention, a data management method is provided for a system having a client device and a server device, the method including at the client device, creating respectively application data related to a specific application, a schema table defining a data structure for storing the application data, and an application data change log indicating creation, modification and deletion of the application data; at the client device, storing the application data, the schema table, and the application data change log; at the client device, transmitting the application data and the schema table; and at the server device, storing the application data, based on the schema table.

According to yet another aspect of the present invention, a data management method is provided for a device, the method including creating application data related to a specific application, a schema table defining a data structure for storing the application data, and an application data change log indicating creation, modification and deletion of the application data; and storing the application data, the schema table, and the application data change log.

BRIEF DESCRIPTION OF THE DRAWINGS

Other aspects, advantages, and salient features of the invention will become apparent to those skilled in the art from the following detailed description, which, taken in conjunction with the annexed drawings, discloses embodiments of the invention.

DETAILED DESCRIPTION OF THE PRESENT INVENTION

Non-limiting embodiments of the present invention will now be described more fully with reference to the accompanying drawings. This invention may, however, be embodied in many different forms and should not be construed as limited to the embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent embodiments of the invention, they are not necessarily to scale and certain features may be exaggerated or omitted in order to better illustrate and explain the present invention.

Among the terms set forth herein, "data" refers to all kinds of information created by any activated application. Data may include a schema table being variable according to the activation of applications, a schema table change log created by a change in data schema, application data created by the activation of applications, and an application data change log indicating the creation, modification and deletion of application data.

A "schema table" refers to an orderly arrangement of data schema that defines a data structure of application data.

When a data structure is changed to accept the creation, modification and deletion of a specific application, data schema is also changed. A schema table change log refers to a record to indicate the update of a schema table depending on a change in such data schema.

"Application data" may include data created while an activated application performs a particular function according to a given schedule, data created in response to an input signal invoked by a user's request, and data received from any external entity by an application.

An "application data change log" refers to a record which indicates the creation, modification or deletion of application data.

"Schema information" is a description of a data structure and, for example, defines the form of a data structure required for storing application data.

Figure 1:
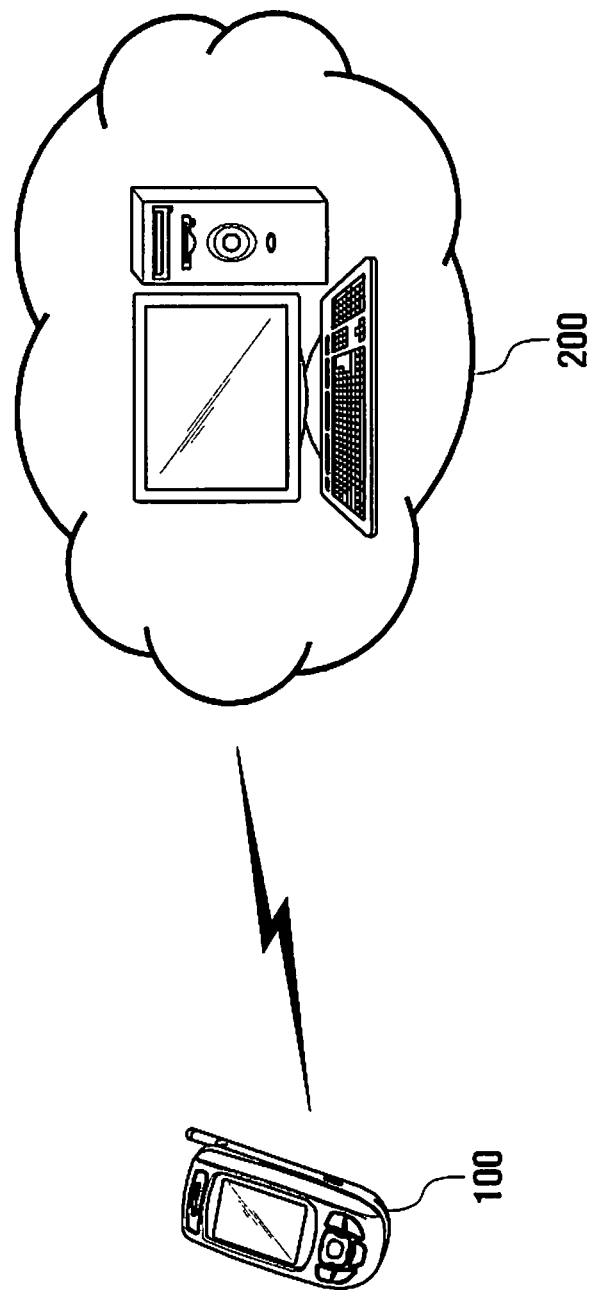
FIG. 1 illustrates a data management system with a client-server structure in accordance with an embodiment of the present invention.

FIG. 1 illustrates a data management system with a client-server structure in accordance with an embodiment of the present invention.

Referring to FIG. 1, the system is composed of a client device 100 (client) and a server device 200 (server).

The server 200 establishes a communication channel with the client 100 at a user's request. The server 200 may receive data from the client 100 or transmit data to the client 100. Particularly, the server 200 may receive at least a schema table and application data from the client 100 and then store it in a memory unit. The client 100 creates both a schema table change log and an application data change log. Depending on those logs, the client transmits a schema table and application data. Additionally, the server 200 may transmit at least one of a schema table and application data to the client 100, depending on the schema table change log and an application data change log created by the server 200.

Although FIG. 1 depicts a personal computer as the server 200, other equivalents may be also used as the server 200. In some cases, the server 200 may be the same type of device as the client 100, or may have the same functional elements as the client 100 has. For example, if the client 100 has an RF unit and a connection interface in order to establish a wired or wireless communication channel with the server 200, the server 200 may have the same elements, namely, an RF unit and a connection interface, and further have a memory unit to store data received from the client 100. In order to receive a schema table and application data from the client 100 and store them in the memory unit, the server 200 may have the same element as a control unit of the client 100. Thus, respective elements of the client 100 to be described hereinafter may be also applied to the server 200.

The client 100 may have various applications. For example, the client 100 may have a camera module, a media player module, a file search module, a broadcast television reception module, etc., and further store applications suitable for respectively operating such modules. When each application is activated, the client 100 may create a new data structure or load an existing data structure.

In addition, the client 100 may apply the creation, modification and deletion of application data to a data structure. In this process, the client 100 may obtain data schema information about a data structure and then store it as a schema table. Additionally, the client 100 may separately store a schema table change log based on the creation, modification and deletion of a data structure. When a selected application is activated, the client 100 initializes the activated application and then performs a particular function at a user's request or according to a given schedule. While such an application is running, the client 100 may create, modify or delete application data. The client 100 may create, modify or delete a data structure to which application data is applied. Here, the client 100 may generate and store an application data change log with regard to the creation, modification and deletion of application data. The client 100 may obtain data schema information with regard to the creation, modification and deletion of a data structure and then store it as a schema table. The client 100 may generate a schema table change log, depending on the creation of a schema table.

Consequently, the client 100 stores application data produced by the execution of a selected application, an application data change log recording a change in application data, a schema table regarding a data structure, and a schema table change log produced by a change in a schema table. However, a data structure may remain unchanged even though application data is created, modified or deleted. In this case, since there is no change in data schema, a schema table is also unchanged and therefore a schema table change log is not produced, except that a data table for application is created first. The client 100 may be a mobile device, a Personal Digital Assistant (PDA), a personal computer, a notebook, or any other electronic device. The structure of the client 100 will now be described hereinafter with reference to the accompanying drawings.

Figure 2:
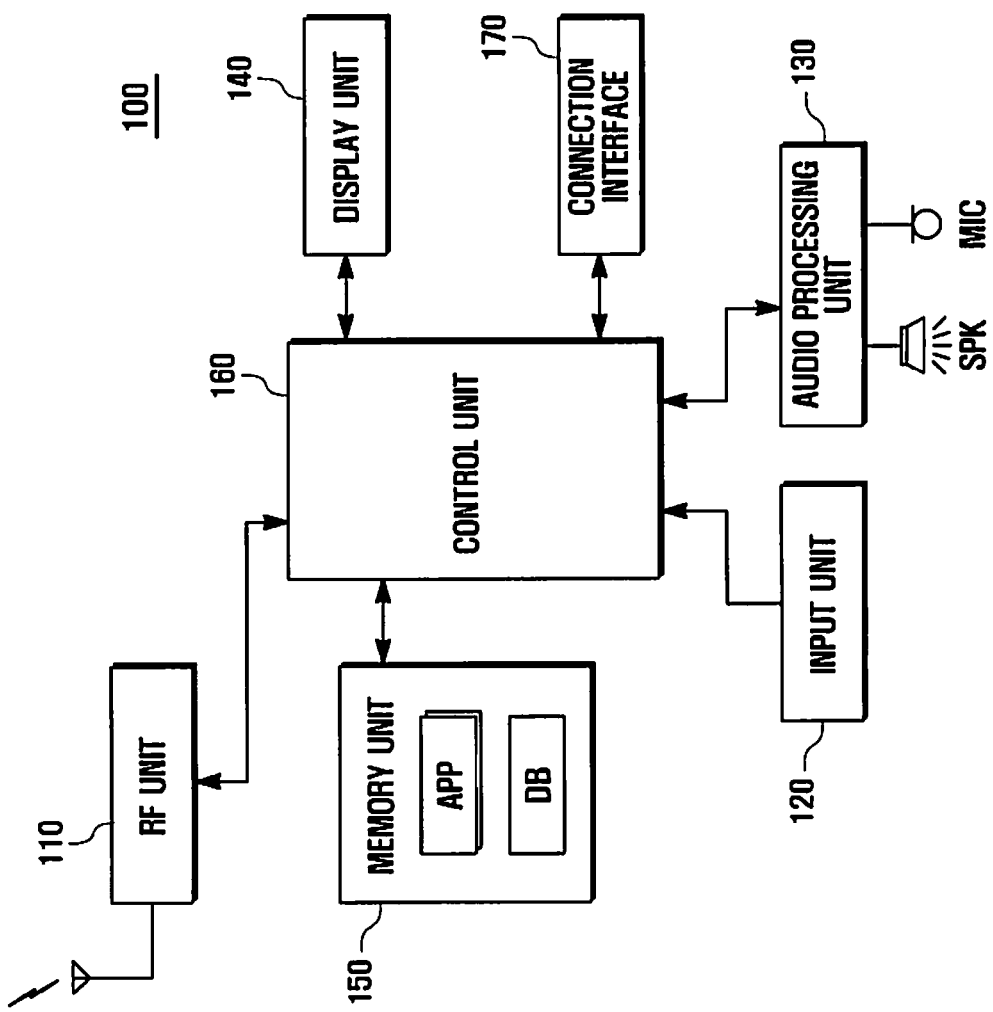
FIG. 2 is a block diagram illustrating the configuration of a device used as a client or server in accordance with an embodiment of the present invention.

FIG. 2 is a block diagram illustrating the configuration of a device used as a client or server in accordance with an embodiment of the present invention.

In the following description, a mobile device inherently having a mobile communication function is used as an example of a client device 100. This is, however, only one embodiment and not to be considered as a limitation of the present invention. As mentioned above, the client device 100 may be a personal computer, a notebook, or any equivalent. In this case, an RF unit to be discussed below may be interpreted as any kind of communication module for access to a mobile communication network or any other communication network through a wireless access point (AP), local area network (LAN) or the like. Additionally, the configuration of the client device 100 to be described hereinafter may be equally applied to the server device 200 shown in FIG. 1. In other words, the devices discussed below may be employed as both the client and server.

Referring to FIG. 2, the client device 100 includes a radio frequency (RF) unit 110, an input unit 120, an audio processing unit 130, a display unit 140, a memory unit 150, a connection interface 170, and a control unit 160.

The client device 100 having the above elements may activate at least one of applications stored in the memory unit 150 by a user's request. Here, an activated application may create, modify or delete application data, and the client device 100 may create a schema table change log regarding a change in a data structure that may be influenced by at least one of the creation, modification and deletion of application data. When a data structure is changed, the client device 100 may create a schema table and then create and store a schema table change log recording the creation of a schema table. The client device 100 may also create and store an application data change log to record at least one of the creation, modification and deletion of application data caused by an activated application. Through the above process, the client device 100 may create and store at least one of a schema table change log, a schema table, an application data change log, and application data.

Thereafter, based on a schema table change log and an application data change log, the client device 100 may control the transmission of at least one of a schema table and application data to the server device through the RF unit 110 or the connection interface 170 at a user's request. For this, the client device 100 may establish wired and/or wireless communication channels with the server device through the RF unit 110 or the connection interface 170. Therefore, the client device 100 not only stores a schema table and application data in the memory unit 150, but also transmits application data to the server device. Thus, without explicitly sharing the data schema, the server device can store application data in the same way as it is stored in the client device 100. Now, each individual element will be described in detail.

The RF unit 110 may include an RF transmitter which up-converts the frequency of signals to be transmitted and amplifies the signals, and an RF receiver which amplifies received signals with low-noise and down-converts the frequency of the received signals. Particularly, under the control of the control unit 160, the RF unit 110 may establish a communication channel to transmit at least one of application data and a schema table stored in the memory unit 150 to the server device. For example, the RF unit 110 may transmit data, created under the control of the control unit 160, according to predefined protocol, such as HTTP, FTP, TCP/IP and the like. Here, data created by the control unit 160, such as application data, a schema table, an application data change log and a schema table change log, may be converted into a suitable form for transmission based on protocol when selected for transmission. Data creation by the control unit will be described in detail later.

The input unit 120 includes a plurality of input keys and special function keys that are configured to receive user's instructions. The function keys may include navigation keys, side keys, shortcut keys, and any other special keys. The input unit 120 creates various key signals in association with user's instructions and delivers them to the control unit 160. The input unit 120 may create an input signal for selecting one of various applications at a user's request, an input signal for storing application data and a schema table in the memory unit 150, and an input signal for transmitting application data and a schema table to the server device, and then may deliver a created input signal to the control unit 160.

The audio processing unit 130 includes a speaker (SPK) for outputting audio data and a microphone (MIC) for receiving audio signals. The audio processing unit 130 may output a specific audio signal depending on the activation of a particular application or may control the reception of audio signals at the request of an application. Such audio signals may be considered as a kind of application data produced depending on the activation of an application.

The display unit 140 displays data from the client device 100. For example, the display unit 140 may output a predefined idle or main page, a variety of menu pages, some next-depth pages of each menu page, a given page after each menu item is selected and executed, and the like.

When a selected application is activated, the display unit 140 outputs a given page related to such activation. For example, if a communication service application such as a voice call or a video call is activated, the display unit 140 displays a prearranged page of an incoming or outgoing call. If a phonebook application is activated, the display unit 140 displays information contained in a phonebook in a prearranged form. If a media player application is activated, the display unit 140 displays a given image in a played file. In other words, the display unit 140 outputs predetermined image, page, information, etc. according to the activation of each application.

Additionally, when the server device is in a wired or wireless connection, the display unit 140 may display an icon or image for indicating a connection state on part or all of a screen. Furthermore, when data stored in the memory unit 150 is transmitted, the display unit 140 may display a suitable icon or image for each progressing step to indicate an attempt at transmission, a transmission-in-progress, or a completed transmission.

The display unit 140 may be formed of a Liquid Crystal Display (LCD), an Organic Light Emitting Device (OLED), or any other equivalent. In the case of an LCD, the display unit 140 may be composed of an LCD controller, a data memory and an LCD panel. In some embodiments, the display unit 140 may be formed by a touch screen which may be combined as the input unit 120.

The memory unit 150 stores a variety of programs required for the operation of the client 100 and related data. The memory unit 150 may consist of a program region (App) and a data region (DB).

The program region (App) may store an operating system (OS) for booting the device, and applications required for various options of the device, such as a media player, an application for file searching, an application for receiving broadcast media, and the like. Particularly, the program region (App) may store a schema-free application for supporting schema-free functions. Specifically, a schema-free application is composed of several modules such as a data sync manager, a sync engine, an application data adapter, a schema adapter and a database manager, and is loaded in the control unit 160 by the request of the control unit 160 when a specific application is activated.

The data region (DB) stores data created while a certain application is activated. For example, the data region (DB) may store application data associated with various options of the device, such as user-recorded data, audio data, video data, phonebook data, content, or any other user input data. Particularly, the data region (DB) may store at least one of a schema table change log, a schema table, an application data change log, and application data.

When an input signal for activating a phonebook application is produced through a menu or hot key, the client device 100 activates a phonebook application stored in the program region (App) and outputs a suitable page on the display unit 140. Here, a user may enter instructions to create, modify or delete any user data in a phonebook page. In response to user's instructions, the client device 100 changes user data stored in a phonebook, and the phonebook application stores such changed user data in a data structure predefined by the manufacturer. Here, the client device 100 obtains schema information defining a data structure and, based upon it, creates a schema table. Then the client device 100 further creates and stores a schema table change log which records a change in a schema table. Here, the user data may correspond to application data of a phonebook application and may be created, modified or deleted in response to a suitable input signal.

As application data is changed, the data structure may be also changed. For example, if there is a need to store eleven sets of user data in a data structure having a tree for ten sets of user data, a phonebook application may change a data structure to a new one, in a designed manner, which allows storing eleven or more sets of user data. Once the data structure has changed, the client device 100 may create a schema table and a schema table change log.

In another case, a phonebook application may change application data without necessarily changing the data structure. Namely, when a user deletes or modifies a selected user data, a phonebook application may delete or modify selected application data without changing the data structure itself. The client device 100 also creates an application data change log for recording a change in application data. In this process, the client device 100 creates and stores both the application data and the application data change log without updating the schema table and the schema table change log.

In summary, when any application is activated, the client device 100 creates, modifies and deletes application data and then stores an application data change log to record the change in application data. Also, when a data structure is created, modified or deleted during the above process, the client device 100 creates a schema table and a schema table change log to record the creation of a schema table and then stores them. When a schema table is not changed, the client device 100 creates and stores only application data and an application data change log without a new schema table and a schema table change log. However, the client device 100 may create a new schema table and a schema table change log when the client device 100 creates the initial application data or the initial schema table.

The connection interface 170 is configured to establish a communication channel with the server device. For example, the connection interface 170 may be formed with a USB interface, an UART interface, a short distance communication module, and the like. If the connection interface 170 is a wired interface, the client device 100 and the server device may further have a signal line that allows transmission and reception of signals through the connection interface 170. In the connection interface 170, the number of connecting pins and the shape of a communication module may be varied according to the type of interface.

The control unit 160 controls the general operation of the device and the flow of signals between the above-discussed elements. Particularly, in order to share non-prearranged data schema with the server device, the control unit 160 according to an embodiment of this invention may include elements shown in FIG. 3.

Figure 3:
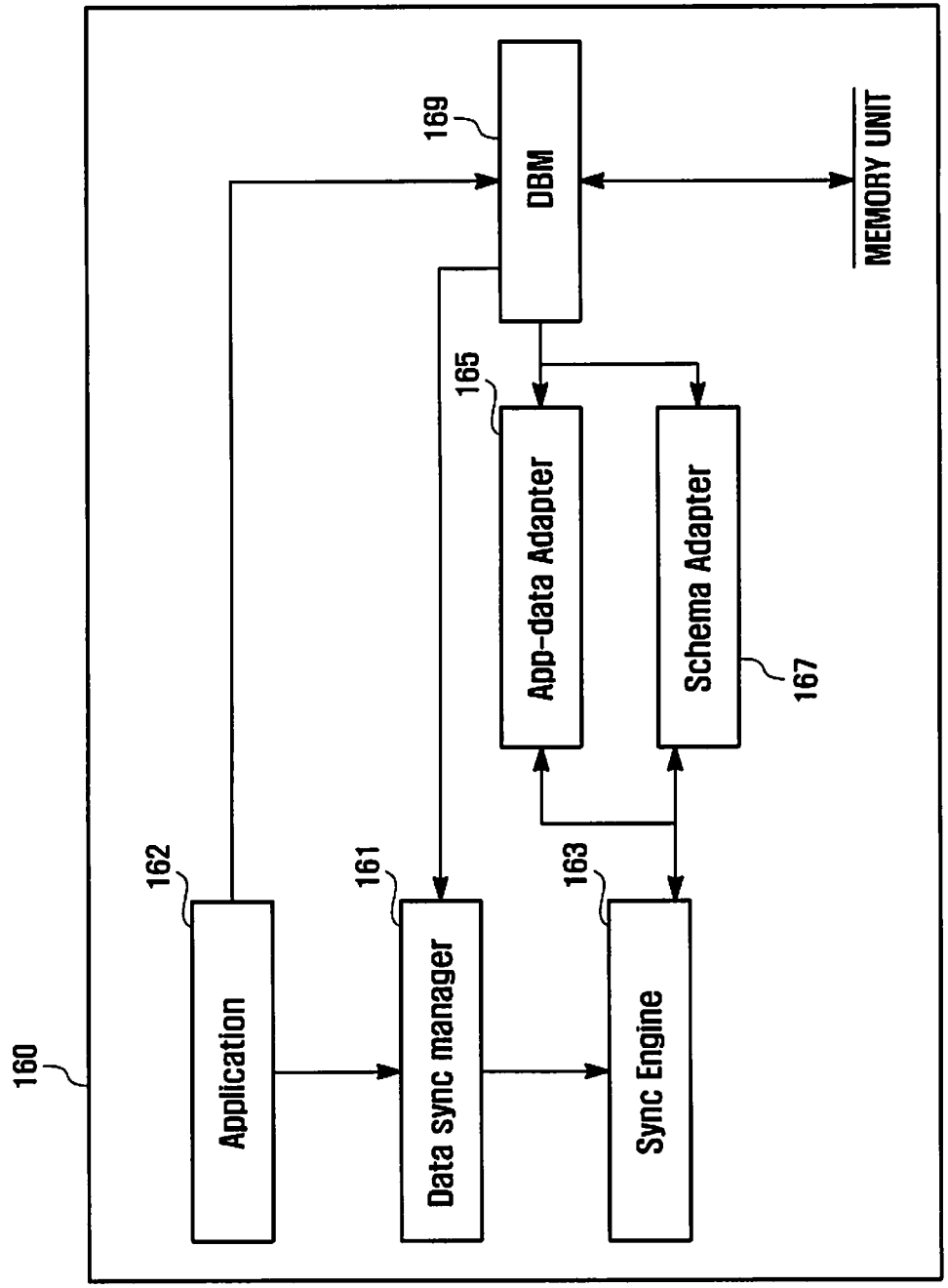
FIG. 3 is a block diagram illustrating a detailed configuration of a control unit shown in FIG. 2.

FIG. 3 illustrates a detailed configuration of the control unit shown in FIG. 2. Referring to FIG. 3, the control unit 160 may include a data sync manager 161, a sync engine 163, an application data adapter 165, a schema adapter 167, and a database manager (DBM) 169. In addition, the control unit 160 may further activate an application 162 in response to an input signal delivered from the input unit 120. As discussed above, these elements are usually stored in the memory unit 150 and then, in response to a user's request or a call by the control unit 160, are temporarily loaded in the control unit 160 to facilitate the storage and transmission of data.

The application 162 supports particular functions of the client device 100. The application 162 may be selected depending on an input signal received from the input unit 120 or a given schedule. For example, when a given initialization process is completed after power-on, the client device may activate a communication service application and maintain an idle state. If the input unit 120 sends an input signal for web access, the application 162 may be a web application that supports access to a specific web server device through the RF unit 110. The application 162 may be one of various software programs stored in the memory unit 150 or one of many programs supporting respective modules for executing particular functions in the client device 100. When any data is created, the application 162 delivers it to the database manager 169.

The database manager 169 receives and stores application data created by the application 162 and then, based on application data, creates an application data change log. Additionally, the database manager 169 also manages a schema table that contains data schema created by the activation of the application 162. The database manager 169 also creates a schema table change log depending on the creation and change of a schema table. Meanwhile, the database manager 169 may deliver an application data change log and a schema table change log to the data sync manager 161.

The data sync manager 161 offers an API (Application Programming Interface) for a synchronization operation and also provides a change log API when receiving a synchronization request from the application 162. In addition, while performing a synchronization operation, the data sync manager 161 examines whether there is a schema table change log by using the database manager 169. If there is a schema table change log, the data sync manager synchronizes the schema table. Thereafter, by examining the application data change log, the data sync manager 161 determines whether there is application data to be transmitted. If an application data change log indicates that there is application data to be transmitted, the data sync manager 161 retrieves the application data and supports transmission thereof.

The sync engine 163 is configured to transmit a schema table or application data to a sync engine of the server device, under the control of the data sync manager 161. Additionally, the sync engine 163 delivers data received from the server device, namely, application data or a schema table, to the application data adapter 165 or the schema adapter 167. If there is a synchronization request for data transmission after the client establishes a communication channel with the server device, the sync engine 163 converts at least one of an application data and a schema table into specific commands under the control of the data sync manager 161 and then sends it through a communication channel. Here, specific commands are formatted such that they are recognizable by the sync engine. The server device also has the same sync engine and receives commands from the client. If receiving specific commands from the server device, the sync engine 163 restores at least one of the application data and schema table indicated by the received commands. Then restored data is delivered to the application data adapter 165 or the schema adapter 167.

The application data adapter 165 is disposed between the sync engine 163 and the database manager 169, and converts application data received from the sync engine 163 into a suitable form for the memory unit through the database manager 169. If there is a synchronization request for transmitting specific data stored in the memory unit to the server device, the application data adapter 165 receives application data from the database manager 169 under the control of the data sync manager 161, converts the data into a suitable form for the sync engine 163, and delivers the converted data to the sync engine 163. When receiving application data from the sync engine 163, the application data adapter 165 converts the received data into a suitable form for the memory unit and delivers the data to the database manager 169.

The schema adapter 167 is also disposed between the sync engine 163 and the database manager 169, and performs a similar data-mediating task regarding data schema as the application data adapter 165 does. Since data passing through the sync engine 163 may not be directly stored in the memory unit, the schema adapter 167 converts a schema table received from the sync engine 163 into a suitable form for being stored in the memory unit through the database manager 169 and then delivers the converted data to the database manager 169. Additionally, if there is a synchronization request for transmitting specific data stored in the memory unit to the server device, the schema adapter 167 receives a schema table from the database manager 169 under the control of the data sync manager 161 and then delivers it to the sync engine 163. For example, the schema adapter 167 converts a schema table into XML document format and sends it to the sync engine 163.

If there is no schema table related to specific data to be transmitted to the server device, the schema adapter 167 may halt the transfer operation, unlike the application data adapter 165 which cannot halt transmission. Meanwhile, depending upon the result of synchronization, the schema adapter 167 may perform the creation, inquiry, update, or deletion of a schema table stored in the database manager 169.

In summary, the above-discussed elements of the control unit 160 perform a function to store data created by the activation of the application 162 in the memory unit 150, a function to transmit specific data stored in the memory unit 150 to the server device, and a function to store data received from the server device in the memory unit 150.

In order to store data associated with the activated application 162, the control unit 160 enables the database manager 169 to directly receive data from the application 162, to individually create an application data change log, a schema table and a schema table change log, and to respectively store them.

If there is a synchronization request for transmitting specific data stored in the memory unit 150, the data sync manager 161 of the control unit 160 checks through the database manager 169 whether there is a schema table change log in the memory unit 150. If there is, the data sync manager 161 controls first the synchronization of the schema table. Additionally, the data sync manager 161 checks the application data change log stored in the memory unit 150 and then, based on it, controls performing the synchronization of application data. At this time, the application data adapter 165 and the schema adapter 167 receive both application data and a schema table from the database manager 169 under the control of the data sync manager 161 and converts them into suitable forms for the sync engine 163.

Where data received by the sync engine 163 is stored in the memory unit 150, the control unit 160 enables both the application data adapter 165 and the schema adapter 167 to convert data received through the sync engine 163 into a suitable form for a database and then stores it in the memory unit 150. Here, if data schema to be stored in the memory unit 150 is changed, the control unit 160 updates a schema table by using a schema table received from the server device. Additionally, based on an updated schema table, the control unit 160 may store application data to be received later in the memory unit 150.

In the case of storing data created by an activated application, each device in the data management system according to an embodiment of the present invention stores a schema table defining a change in a data structure, a schema table change log indicating a change in a schema table, application data actually changed, and an application data change log. When performing a synchronization process for data transmission, a transmitting device in the data management system determines whether to update a schema table by checking a schema table change log stored in the memory unit. If there is a schema table change log, the transmitting device sends a schema table to the counterpart, i.e., a receiving device, by using a schema table change log. Next, the receiving device updates a schema table and based on an updated schema table, may store application data to be received later. Accordingly, the system and device according to this invention may allow data sharing through transmission and stores application data without a particular agreement in data schema.

Meanwhile, the above-discussed configuration of the client 100 may be equally applied to the server device 200 in the system. Namely, the server device 200 may include the same elements as the client 100, such as the RF unit, the display unit, the memory unit, the input unit, the audio processing unit, the connection interface and the control unit. In the case where the server device is only configured to receive data from the client and then store it, the control unit of the server device may have only the sync engine, the application data adapter, the schema adapter and the database manager among the elements in the control unit. In another case where the server device is further configured to transmit data to the client, the control unit of the server device may further have the data sync manager, just as the client does.

Now, a data management method in the aforesaid system and device according to an embodiment of the present invention will be described hereinafter with reference to the accompanying drawings.

Figure 4:
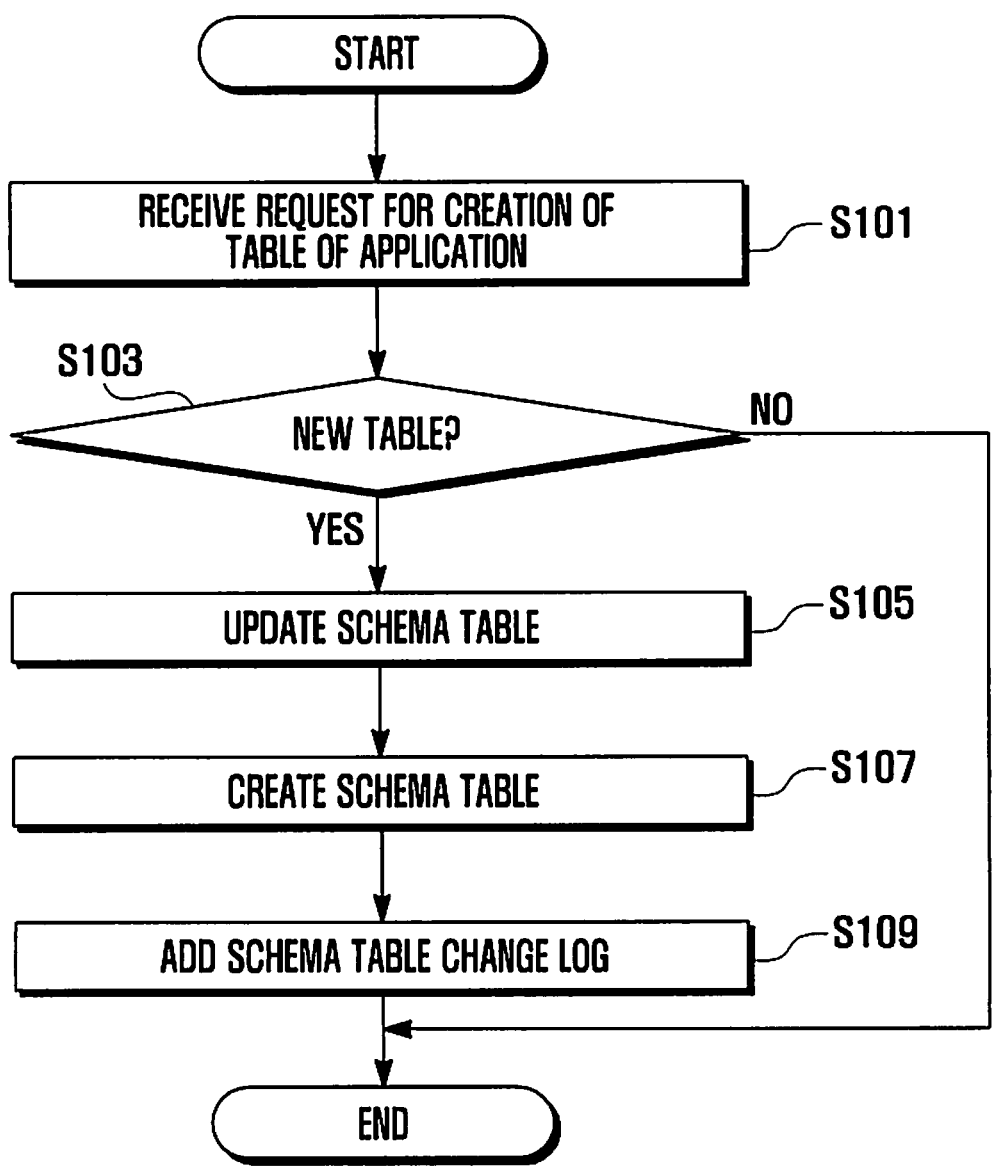
FIG. 4 is a flow chart illustrating a method for managing a schema table in accordance with an embodiment of the present invention.

FIG. 4 illustrates a method for managing a schema table in accordance with an embodiment of the present invention.

Referring to FIGS. 1 to 4, at the outset, the client device 100 may activate a specific application 162. While the application 162 is running according to an input signal from the input unit 120 or according to a given schedule, the client device 100 may receive a request for the creation of a table at step S101. Namely, when certain application data is added by the activation of the application 162, when existing application data is deleted, or when the creation of a table is required due to a change in existing data, the application 162 may request the creation of a table.

Next, the client device 100 determines whether a requested table is a new one at step S103. For example, when an image capture application is activated, the client device 100 may capture and store images in response to the user's instructions. In this process, if an existing table is adequate to store images, a new table is not required in step S103. However, if a new table is needed to store captured images, or if an existing table should be extended, the client device 100 may determine instep S103 that a new table is required.

If a new table is needed, the client device 100 obtains schema information for a new table and then stores it in a schema table in step S105. If there is an existing schema table for storing data of the application 162, the client device 100 may update such a table.

Next, the client device 100 creates a table requested by the application 162 in step S107. Thereafter, the client device 100 creates a schema table change log regarding the updated schema table and then adds it in step S109. Through the above process, the client device 100 can perform schema table management.

On the other hand, the schema table managing method shown in FIG. 4 may be performed in the server device 200 as well as in the client device 100. If a user uses the server device 200 to activate a specific application, application data is created in the server device 200 and may often change a schema table stored in the server device 200. Here, the server device 200 may perform the same method for managing a schema table as the client device 100 does.

Additionally, a change in the server's schema table may be caused by a schema table offered by another client device. Specifically, if a number of client devices are connected to a single server device, the first client may update a specific schema table in the memory unit of the server device. In this case, the server device may create and store a schema table change log regarding the update of a schema table. If the second client requests a data synchronization process, the server device may transmit an updated schema table based on a schema table change log to the second client and then support the update of a schema table.

Figure 5:
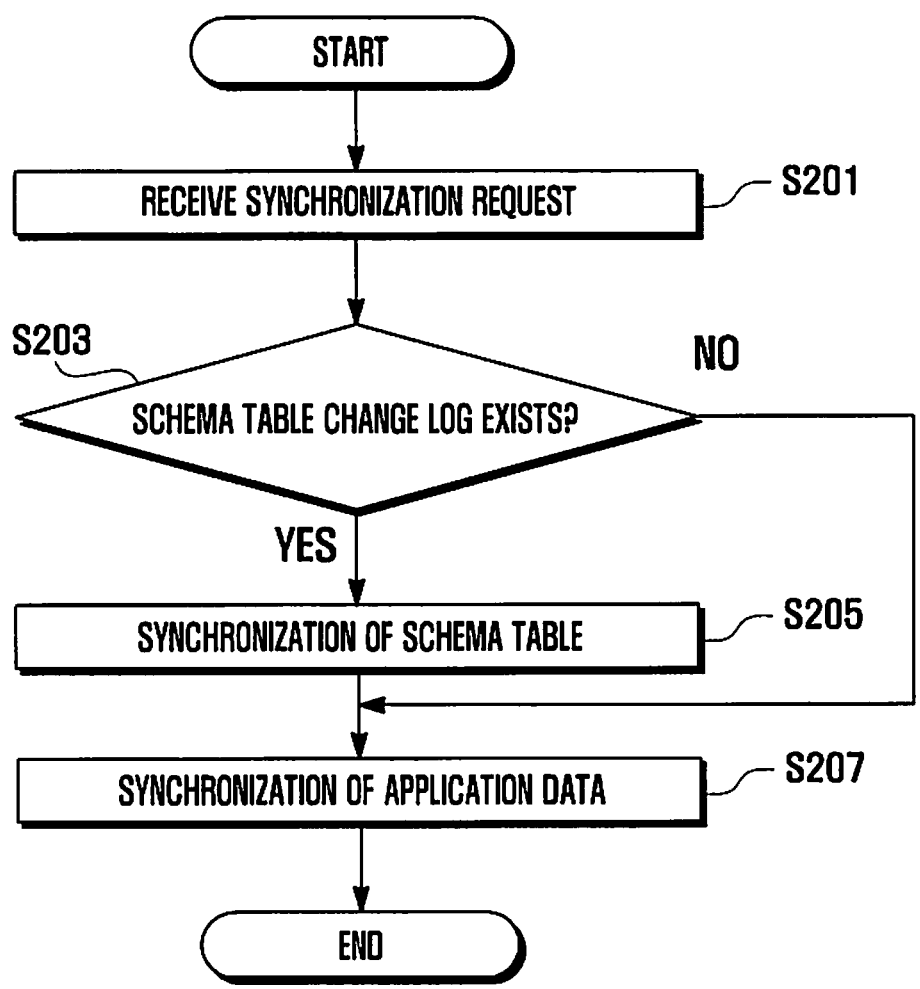
FIG. 5 is a flow chart illustrating a method for sharing data in accordance with an embodiment of the present invention.

FIG. 5 illustrates a method for sharing data in accordance with an embodiment of the present invention.

Referring to FIGS. 1 to 3 and 5, the client device 100 may receive a synchronization request in step S201. Specifically, a user may initiate a wired or wireless connection between the client device 100 and the server device 200 and then select a suitable menu or key for a synchronization process. Next, the client device 100 may receive a signal related to a synchronization request from the server device 200.

The client device 100 then determines whether there is a schema table change log in step S203. If any schema table change log exists, the client device 100 performs the schema table synchronization in step S205. The client device may determine whether there is a need for an update of the schema table, depending on whether a schema table change log is stored in the memory unit. Also, the client device 100 may convert a schema table into a suitable form for transmission through the sync engine 163 by using the schema adapter 167, and may transmit a converted schema table to the server device 200 through the sync engine 163. Next, the server device 200 receives a schema table from the client device 100 and stores it. In this process, a schema table may be converted into specific commands through the sync engine 163. Additionally, the sync engine 163 of the server device 200 restores received commands and delivers it to the schema adapter 167 of the server device 200. Then the schema adapter 167 of the server device 200 converts a schema table received from the client device 100 into a suitable form for storage in the memory unit. At this time, if a schema table has been already stored in the memory unit, the server device 200 may update an existing schema table by using the received schema table.

Thereafter, the client device 100 synchronizes the application data in step S207. Specifically, after transmitting a schema table based on a schema table change log, the client device 100 determines whether an application data change log is stored in the memory unit 150 by using the data sync manager 161. If there is an application data change log, the client device 100 instructs the database manager 169 to deliver application data stored in the memory unit 150 to the application data adapter 165. Then the application data adapter 165 of the client device 100 converts application data into a suitable form for the sync engine 163. The sync engine 163 in turn, converts the application data into specific commands so that the sync engine 163 of the server device 200 can receive it. Next, the server device 200 restores received commands through the sync engine 163 and stores application data in the memory unit 150 by using the application data adapter 165.

As discussed above, in the data management method of this invention, the client device 100 creates a schema table and a schema table change log regarding created data and then, referring to a schema table change log, transmits a schema table to the server device 200 when the client device 100 and the server device 200 perform a data synchronization process. Even though there is no pre-defined agreement about how to store application data created in the client device 100, the client device 100 and the server device 200 may share data by transmitting and receiving a schema table at the time of synchronization.

As the client device 100 transmits a schema table and application data to the server device 200, the server device 200 may also transmit a schema table and application data back to the client 100. Namely, when the server device 200 receives a schema table from another client device, or when a schema table is updated in the server device 200, the server device 200 creates and stores a schema table change log and also stores an application data change log and application data. Additionally, if the server device 200 tries to synchronize application data with that of the client device 100 by a synchronization request of the client device 100, the server device 200 determines whether to transmit an updated schema table based on the schema table change log stored in its own memory unit and then may transmit the updated schema table to the client device 100. The client device 100 in turn updates a schema table stored in its own memory unit, depending on the received schema table, and will store application data to be received later, depending on the updated schema table.

While this invention has been particularly shown and described with reference to several embodiments thereof, it will be understood by those skilled in the art that various changes in form and details may be made therein without departing from the spirit and scope of the invention as defined by the appended claims.

What is claimed is:

1. A data management system comprising:
   a client device configured to store an application data change log, a schema table, and, a schema table change log indicating a change in the schema table, wherein the application data change log indicates at least one of creation, modification and deletion of application data created by activation of an application, and wherein the schema table defines a data structure for storing the application data, and is formed to be variable according to the activation of applications, to update the schema table when a new schema table is required according to the activation of applications, and to add a change log of the updated schema table to the schema table change log; and
   a server device configured to receive at least one of the schema table and the application data from the client device through a communication channel with the client device, to apply the creation, modification and deletion to the application data, based upon the schema table, and to store the application data.

2. The system of claim 1, wherein the client device includes:
a memory unit configured to store a schema table change log which indicates a change in the schema table depending upon a change in the data structure according to creation of application data;
a control unit configured to control transmission of at least one of the schema table and the application data, based upon at least one of the schema table change log and the application data change log, to the server device; and
at least one of a radio frequency unit and a connection interface configured to establish the communication channel for data transmission.

3. The system of claim 1, wherein the server device includes:
a server control unit configured to control reception of at least one of the schema table and the application data from the client device; and
a server memory unit configured to store application data, based upon the schema table.

4. A data management device comprising:
a memory unit configured to store at least one application and at least one item of data among application data created by activation of the application, an application data change log indicating a change in the application data, a schema table defining a data structure for storing the application data, and a schema table change log indicating a change in the schema table, wherein the schema table is formed to be variable according to the activation of applications;
at least one of a radio frequency unit and a connection interface configured to establish a communication channel for transmitting the at least one item of data; and
a control unit configured to control transmission of the at least one item of data through the communication channel in response to an input signal and to update the schema table when a new schema table is required according to the activation of applications, and to add a change log of the updated schema table to the schema table change log.

5. The device of claim 4, wherein the control unit includes:
a database manager configured to receive data created by the application, to store the application data in the memory unit, to create both the application data change log and the schema table change log, and to manage the schema table;
a data sync manager configured to offer an Application Programming Interface (API) for a synchronization operation and to provide a change log API when there is a synchronization request;
a sync engine configured to convert the application data into specific commands under the control of the data sync manager, to transmit the converted data, and to restore received specific commands;
an application data adapter configured to convert the application data among data received from the sync engine into a suitable form for the memory unit through the database manager, and to deliver the application data stored in the memory unit to the sync engine; and
a schema adapter configured to convert the schema table among the data received from the sync engine into a suitable form for the memory unit through the database manager, and to deliver the schema table stored in the memory unit to the sync engine.

6. A data management method in a system having a client device and a server device, the method comprising steps of:
at the client device, creating at least one of application data related to a specific application, a schema table defining a data structure for storing the application data, and an application data change log indicating creation, modification and deletion of the application data created by activation of the specific application, wherein the schema table is formed to be variable according to the activation of applications;
at the client device, storing at least one of the application data, the schema table, and the application data change log, and a schema table change log indicating a change in the schema table;
at the client device, transmitting at least one of the application data and the schema table to the server device;
at the client device, updating the schema table when a new schema table is required according to the activation of applications;
at the client device, adding a change log of the updated schema table to the schema table change log; and
at the server device, storing the application data, based upon the schema table.

7. The method of claim 6, wherein the transmitting step at the client device includes:
at a sync engine of the client device, converting at least one of the application data and the schema table into specific commands;
transmitting the specific commands to a corresponding sync engine of the server device; and
converting the received specific commands into data suitable for storage in a memory unit of the server device.

8. The method of claim 6, wherein the creating step at the client device includes:
creating a schema table change log indicating a change in the schema table depending upon a change in the data structure.

9. The method of claim 8, wherein the storing step at the client device includes:
storing the schema table and the schema table change log.

10. The method of claim 9, wherein the transmitting step at the client device includes:
when receiving an input signal for synchronizing data stored in the client device, the client device determines whether the schema table change log of the client device exists; and
if the schema table change log exists, the client device transmits the schema table to the server device.

11. The method of claim 10, wherein the storing step at the server device includes:
updating the stored schema table, based upon the received schema table.

12. The method of claim 11, wherein the storing step at the server device includes:
storing the application data if the client device transmits the application data, based upon the updated schema table.

13. A data management method in a device, the method comprising steps of:
receiving an input for generating application data related to a specific application;
storing a schema information corresponding to the application data as a schema table defining a data structure for storing the application data, the schema information being a description of a data structure, wherein the schema table is formed to be variable according to the activation of applications;

generating an application data change log indicating creation, modification and deletion of the application data created by activation of the specific application; and transmitting the application data and the schema table through a communication channel to a server device;

updating the schema table when a new schema table is required according to the activation of applications; and adding a change log of the updated schema table to the schema table change log.

14. The method of claim 13, further comprising:

transmitting the application data and the schema table through a communication channel, wherein the transmitting step includes:

at a sync engine, converting the application data and the schema table into specific commands; and transmitting the specific commands to a corresponding sync engine of a counterpart connected to the communication channel.

15. The method of claim 13, wherein the storing step further comprises:

storing a schema table change log indicating a change in the schema table depending upon a change in the data structure.

16. The method of claim 15, wherein the transmitting step further comprises:

determining, when an input signal for synchronizing stored data is received, by a client device, whether the schema table change log of the client device exists; and transmitting, when the schema table change log exists, by the client device, the schema table through a communication channel.

17. The method of claim 15, wherein the storing step further comprises:

storing the schema table and the schema table change log.

18. The method of claim 15, wherein the transmitting step further comprises:

sending at least one of the application data and the schema table to the server device as specific commands corresponding to at least one of the application data change log and the schema table change log.

19. The method of claim 18, wherein the schema table change log indicates creation, modification and deletion of the schema table.

20. The method of claim 13, wherein the transmitting step further comprises:

determining, when an input signal for synchronizing stored data is received, by a client device, whether the schema table change log of the client device exists; and transmitting, when the schema table change log exists, by the client device, the schema table through the communication channel.

* * * * *